United States Patent
Hago et al.

(10) Patent No.: US 8,122,704 B2
(45) Date of Patent: Feb. 28, 2012

(54) MOTOR SYSTEM FOR DIMINUTION OF CARBON DIOXIDE IN THE ATMOSPHERE

(75) Inventors: Wilson Hago, Camarillo, CA (US); Andre C Morin, Sr., Santa Barbara, CA (US)

(73) Assignee: Efficient Hydrogen Motors, Santa Barbara, CA (US)

( * ) Notice: Subject to any disclaimer, the term of this patent is extended or adjusted under 35 U.S.C. 154(b) by 833 days.

(21) Appl. No.: 12/179,611

(22) Filed: Jul. 25, 2008

(65) Prior Publication Data

US 2009/0038561 A1 Feb. 12, 2009

Related U.S. Application Data

(60) Provisional application No. 60/954,318, filed on Aug. 7, 2007.

(51) Int. Cl.
*F01N 3/00* (2006.01)
(52) U.S. Cl. ............................................ 60/282; 60/280
(58) Field of Classification Search .................. 60/280, 60/607, 608, 609; 123/1 A, 3, 54.1, 54.2, 123/54.4, 193.1, 193.3, 193.4, 197.2, 197.4, 123/289, 292; 290/52
See application file for complete search history.

(56) References Cited

U.S. PATENT DOCUMENTS

| | | | | |
|---|---|---|---|---|
| 3,957,467 A * | 5/1976 | Kim | ................................ | 96/353 |
| 4,003,344 A * | 1/1977 | Bradley | ............................ | 123/3 |
| 4,003,345 A * | 1/1977 | Bradley | ............................ | 123/3 |
| 4,864,825 A * | 9/1989 | Kakuta | ............................ | 60/598 |
| 5,175,998 A | 1/1993 | Simuni | | |
| 5,443,804 A | 8/1995 | Parker et al. | | |
| 5,857,324 A | 1/1999 | Scappatura et al. | | |
| 6,240,725 B1 * | 6/2001 | Scappatura | ..................... | 60/311 |
| 6,637,204 B2 * | 10/2003 | Ellmer et al. | ................... | 60/606 |
| 6,755,892 B2 | 6/2004 | Nalette et al. | | |
| 6,866,702 B2 | 3/2005 | Mitsuda | | |
| 6,890,497 B2 | 5/2005 | Rau | | |
| 7,064,150 B2 | 6/2006 | Matsui | | |
| 2006/0051274 A1 | 3/2006 | Wright et al. | | |
| 2007/0217982 A1 | 9/2007 | Wright et al. | | |
| 2007/0282021 A1* | 12/2007 | Campbell | ..................... | 518/726 |
| 2008/0047502 A1* | 2/2008 | Morse | .............................. | 123/3 |
| 2008/0286165 A1* | 11/2008 | Graupner et al. | ............ | 422/148 |

* cited by examiner

*Primary Examiner* — Thomas Denion
*Assistant Examiner* — Patrick Maines

(57) ABSTRACT

A motor system is described that sequesters ambient carbon dioxide to a removable carbonate salt by reacting ambient carbon dioxide with an alkali metal hydroxide. The carbon dioxide is aspirated by a turbo-generator that receives exhaust gases from an internal combustion engine. The turbo-generator produces electricity to form the hydroxide in situ from the electrolysis of water in a salt solution.

9 Claims, 1 Drawing Sheet

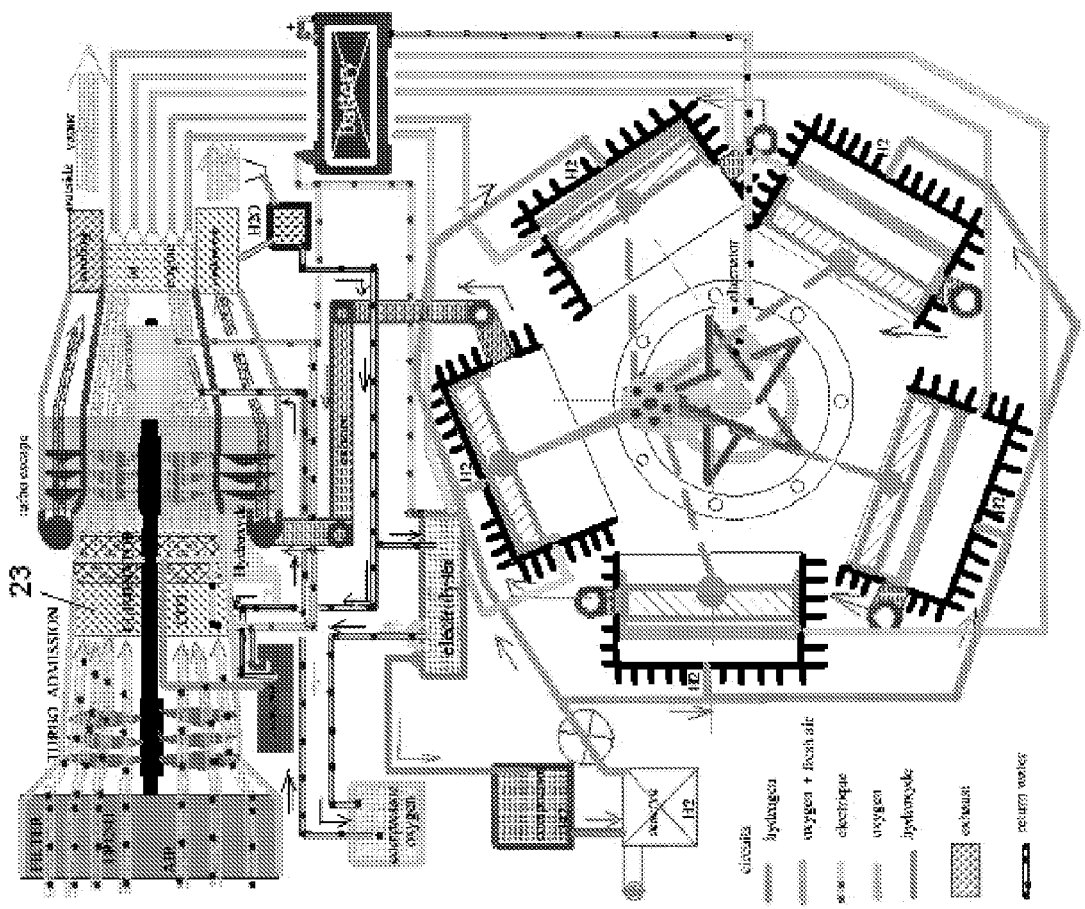

MOTOR SYSTEM FOR DIMINUTION OF CARBON DIOXIDE IN THE ATMOSPHERE

FIELD OF INVENTION

The present invention relates to a reciprocating internal combustion engine which sequesters ambient $CO_2$ into a carbonate salt, thereby helping to reduce a primary cause of global warming.

BACKGROUND AND PRIOR ART

Global warming is expected to become an increasingly important issue for a significant fraction of the world's population. Global temperatures are expected to rise several degrees in the coming decades, leading to extreme weather events, ozone depletion, animal and plant extinctions and more pronounced spread of diseases. Driving much of this warming are hydrocarbon emissions from automobile sources. It is thus natural to assert that since automobiles have brought to our present global warming crisis, they should be the conduit to reverse present $CO_2$ buildup.

We assert that this reversal can be best accomplished via the construction of an automobile motor that burns a carbon-free fuel while at the same time reduces the ambient levels of carbon dioxide in the atmosphere. This is accomplished in the present invention by the reaction of incoming $CO_2$ with aqueous base in the motor system. The aqueous base is produced in situ by electrochemical oxidation of water in the presence of a metal salt. The energy for the electrolysis derives in part from a turbo-generator connected to exhaust end of an internal combustion engine. The reaction of $CO_2$ with hydroxide base is illustrated as follows for hydroxide salts possessing group I cations $M^+$:

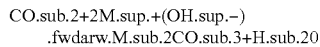

It is understood that cations from groups I (for example $Li^+$, $Na^+$, $K^+$), group II (for example $Ca^{+2}$ or $Sr^{+2}$) or group III (e.g $Al^{+3}$), as well as transition metals, may be used. M may also represent ammonia containing cations, such as $NH_4^+$. The resulting carbonate salt can be collected in a suitable receptacle in the automobile and later disposed in solid form. In this manner we have a net reversal of $CO_2$ emissions. The reaction vessel may be in the form of a grill having hydroxide-containing channels that are exposed to incoming air/$CO_2$. The reaction vessel containing aqueous base may be located in the path to the intake manifold of the engine or it may be located in the path after combustion. The present invention can be also be used in an automobile that burns hydrocarbons, for a diminution of $CO_2$ emissions. Typical reaction temperatures would be from $-25$ degree. C. to 100.degree. C.

The hydroxide in the present invention is made in situ via the electrolysis of an aqueous salt solution as shown in the following reaction:

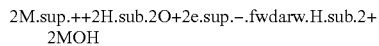

where M is again a metal.

We hereby provide an illustration in FIG. 1 of the manner in which the present invention can be attached to an internal combustion engine to reduce emissions. The hydrogen-powered motor has been described in U.S. patent application Ser. No. 11/611,861. This is by no means the sole manner by which the present invention can be attached to an internal combustion engine. The engine has five cylinders or a multiple of 5 cylinders. Each cylinder contains two compressible chambers wherein first chamber, called the fuel chamber, comprises a cavity made between the inner surface of a cylinder and outer surface of a sliding member moving within said cylinder. The second chamber, called the oxidant chamber, comprises a cavity made between the inner surface of sliding member moving within said cylinder and the outer surface of a piston moving within said sliding member. A fuel source is provided for introducing hydrogen, diesel, or a low carbon hydrocarbon into the fuel chamber and an oxygen source is provided for introducing an oxygen-containing gas mixture into the oxidant chamber. A means is provided for mixing fuel and oxygen from said fuel chamber and oxidant chambers. A means is also provided for igniting this mixture within the oxidant chamber. The said reciprocating pistons are jointly attached to a rotating member whose axis of rotation follows a non-circular trajectory during one revolution. A reaction vessel is connected inline to the oxidant chamber, and said vessel reacts aspirated ambient carbon dioxide with hydroxide to yield a carbonate salt.

As shown in the FIG. 1, a reaction vessel 23, termed 'CO2 Eliminator', is placed inline with the motor air intake. The reaction vessel is preferably a high surface area structure containing an aqueous hydroxide solution that reacts with the incoming carbon dioxide. The solution is circulated in the reaction vessel until it is heavily laden with carbonate salt. The carbonate slurry is transferred to a receptacle that precipitates out the carbonate. The aqueous hydroxide is obtained via electrochemical oxidation of a salt solution (e.g. chloride) contained in the electrolyser shown attached to the CO2 Eliminator. Electricity to run the electrolyser can come from different sources. It can come from an electrochemical storage device such as a battery or the turbo-generator. The turbo-generator can also store energy in the batteries or fuel cells. Typically turbos in automobiles intake hot exhaust and send it back to the engine. In our case the turbo-generator aspirates fresh air to cool the internal engine components and to react the ambient carbon dioxide. The water can come extraneously from a receptacle or can be generated in situ from condensation of exhaust gas.

The invention claimed is:
1. A motor system comprising:
  five cylinders or a multiple of five cylinders, wherein each cylinder contains two compressible chambers;
  a first chamber, called the fuel chamber, comprising a cavity made between the inner surface of said cylinder and an outer surface of a sliding member moving within said cylinder;
  a second chamber, called an oxidant chamber, comprising a cavity made between the inner surface of the sliding member moving within said cylinder and the outer surface of a reciprocating piston moving within said sliding member, wherein said reciprocating pistons are jointly attached to a rotating member whose axis of rotation follows a non-circular trajectory during one revolution;
  a fuel source for introducing hydrogen, diesel, or a low carbon hydrocarbon into the fuel chamber;
  an oxygen source for introducing an oxygen-containing gas mixture into the oxidant chamber, wherein fuel and oxygen are mixed before entering said oxidation chamber and fuel and oxygen are ignited within said oxidation chamber; and
  a reaction vessel connected inline to the oxidant chamber, wherein said reaction vessel reacts aspirated ambient carbon dioxide with hydroxide to yield a carbonate salt.

2. The motor system according to claim 1, wherein the fuel source is one of hydrogen, methane, propane, and diesel.

3. The motor system according to claim 1, wherein the fuel source is selected from liquid-containing tanks gas-containing tanks or compressors.

4. The motor system according to claim 1, wherein the fuel source derives an input from an electrolyzer powered by an electrochemical storage system or generator.

5. The motor system of claim 1, further comprising;
a turbo-generator connected to said motor system receiving exhaust gases from said motor system and producing electricity via the conversion of a rotational energy.

6. The motor system according to claim 5, wherein the turbo-generator is used to ventilate said motor system or motor system components.

7. The motor system according to claim 5, wherein the electricity generated by the turbo-generator is used to power an electrochemical system, selected from one of fuel cells and storage batteries.

8. The motor system according to claim 5, wherein the electricity generated by the turbo-generator is used to power one or more electrolysers.

9. The motor system according to claim 5, wherein the turbo-generator produces electricity used to generate one of hydrogen, oxygen, and hydroxide.

\* \* \* \* \*